(12) United States Patent
Draief et al.

(10) Patent No.: US 12,099,599 B2
(45) Date of Patent: Sep. 24, 2024

(54) APPARATUSES AND METHODS FOR DETECTING MALWARE

(71) Applicant: Huawei Technologies Co., Ltd., Shenzhen (CN)

(72) Inventors: Moez Draief, Munich (DE); Xiang Chen, Beijing (CN); Konstantin Kutzkov, London (GB); Kevin Scaman, Munich (DE); Milan Vojnovic, London (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 255 days.

(21) Appl. No.: 17/538,703

(22) Filed: Nov. 30, 2021

(65) Prior Publication Data

US 2022/0092176 A1    Mar. 24, 2022

Related U.S. Application Data (63) Continuation of application No. PCT/EP2019/064187, filed on May 31, 2019.

(51) Int. Cl.
| | | |
|---|---|---|
| *G06F 11/00* | (2006.01) | |
| *G06F 12/14* | (2006.01) | |
| *G06F 12/16* | (2006.01) | |
| *G06F 21/55* | (2013.01) | |
| *G06N 3/044* | (2023.01) | |
| *G08B 23/00* | (2006.01) | |

(52) U.S. Cl.
CPC .......... *G06F 21/552* (2013.01); *G06N 3/044* (2023.01); *G06F 2221/033* (2013.01)

(58) Field of Classification Search
CPC .............................. G06F 21/552; G06N 3/0445

USPC .......................................................... 726/23
See application file for complete search history.

(56) References Cited

U.S. PATENT DOCUMENTS

| | | | |
|---|---|---|---|
| 7,779,472 B1 | 8/2010 | Lou | |
| 8,776,227 B1 | 7/2014 | Glick et al. | |
| 9,721,097 B1 | 8/2017 | Davis et al. | |
| 10,007,786 B1 | 6/2018 | Bhatkar et al. | |
| 10,282,546 B1* | 5/2019 | Parikh | G06N 3/084 |
| 2012/0150531 A1* | 6/2012 | Bangalore | G06F 40/40 |
| | | | 704/E11.001 |
| 2016/0379136 A1* | 12/2016 | Chen | G06F 21/552 |
| | | | 706/14 |
| 2017/0017793 A1 | 1/2017 | Davis et al. | |
| 2018/0041536 A1 | 2/2018 | Berlin | |

(Continued)

OTHER PUBLICATIONS

Draief et al., "Attention Neural Networks for Malware Detection," pp. 1-15.

*Primary Examiner* — Brandon Hoffman
*Assistant Examiner* — Samuel Ambaye
(74) *Attorney, Agent, or Firm* — Leydig, Voit & Mayer, Ltd.

(57) ABSTRACT

Apparatuses and methods for determining if a computer program is malware and to which malware class it belongs to. In the method, the behaviour of a computer program is traced by observing the activity of the program. Behaviour sequences comprising API-calls or similar activity of a computer program are then provided into a classifier for classifying the computer program. From the outcome of the classifier, a classification result and the portions relevant to decision can be provided to a person for further confirmation.

17 Claims, 3 Drawing Sheets

(56) References Cited

U.S. PATENT DOCUMENTS

2019/0042745 A1    2/2019  Chen et al.
2019/0188260 A1*   6/2019  Hewitt .................. G06F 40/205

* cited by examiner

APPARATUSES AND METHODS FOR DETECTING MALWARE

CROSS-REFERENCE TO RELATED APPLICATIONS

This application is a continuation of International Application No. PCT/EP2019/064187, filed on May 31, 2019, the disclosure of which is hereby incorporated by reference in its entirety.

TECHNICAL FIELD

Generally, embodiments of the following description relate to the field of electronic devices capable of executing computer programs. More specifically, embodiments of the following description relate to apparatuses and methods for detecting malware.

BACKGROUND

Modern computers and computing capable devices, such as mobile phones, cars and household appliances are often provided with a possibility to execute third party computer applications. This provides third parties a possibility to improve devices and to provide experiences that are not provided by the original manufacturer. For example, in case of mobile phones games are a very popular example of improving the mobile phone user experience with third party applications. Third party applications can be related to the need of a user and may be recreational purpose only. In another examples the third party application may relate directly improving the device, for example, in form of updates firmware code or similar.

Many of the modern devices are connected to the internet and often also to telecommunication networks so that they are capable of transmitting messages. This does not only open the door for improvements can also cause malfunction and malicious behavior, as unauthorized third parties might use the devices, connected through the network, for their own purposes, by providing malicious acting software.

Thus, there is a need for providing reliable sources for third party applications. However, the number of applications has grown very rapidly and it is impossible to detect all maliciously acting software, also known as malware, by conventional means. Conventional means include, for example, examining the source code. Furthermore, it is not always sufficient to rely on trusted providers. The computer program may be camouflaged to be from a trusted provider or the trusted provider may have been hacked and the product is incorporated with a malware. It is common that malware is difficult to detect for end users as they often try to act secretly. Furthermore, as the malware producers are aware of common approaches they try to camouflage their software so that it is not easy to determine to be malware.

Malware detection systems that do not require any user interaction have been introduced. They commonly analyze the dissembled source code of a computer program and try to find patterns that are caused by malware. Another possibility is to analyze files comprising a compiled computer program directly, for example, by using a neural network based classifier. These systems may be introduced at an end user device or centralized in the network.

SUMMARY

Apparatuses and methods for determining if a computer program is malware and to which malware class it belongs to are disclosed. In the method, the behaviour of a computer program is traced by observing the activity of the program. Behaviour sequences comprising API-calls or similar activity of a computer program are then provided into a classifier for classifying the computer program. From the outcome of the classifier, a classification result and the portions of the behavior sequence relevant to decision made by the classifier can be provided to a person for further confirmation.

According to a first aspect, a method for detecting malware is provided. The method comprises deriving a behaviour sequence of a computer program, wherein the behaviour sequence is based on the activity of the computer program: classifying the derived behaviour sequence of a computer program: based on the classification result, determining a need for providing the behaviour sequence to an expert: and as a response to the positive determination, outputting the classification result and subsequences of the behaviour sequence relevant to the classification result to the expert: and determining, based on the classification, if the computer program is malware. It is beneficial to determine which subsequences or parts of the behaviour sequence are actually relevant for the classification result. When an expert is verifying the classification result it is beneficial to provide the expert only those parts of the behaviour sequence that have been relevant to the classification result. Thus, the expert is able to concentrate on analyzing the significant part of the behaviour sequence. The determination of the significant part causes a significant reduction to the data content of the behaviour sequence to be analyzed.

In an implementation form of the first aspect, the method further comprises receiving an opinion as a response to the outputting to the expert: and providing the received opinion as a feedback to the classifier. When the classification result and the significant parts of the behaviour sequence have been provided to the expert it is beneficial to use a response received from the expert as a training material for the classifier. This is particularly beneficial as the training material is confirmed to be true.

In a further implementation form of the first aspect, the method further comprises classifying using a neural network based classifier, wherein the neural network based classifier comprises an attention mechanism. It is beneficial to use a neural network based classifier as they are fast and very reliable in machine learning based classification. Furthermore, an attention mechanism can efficiently be used for determining the parts that are significant for determining the classification result.

In a further implementation form of the first aspect, the method further comprises extracting k-grams from the behaviour sequence: inputting extracted k-gram to the classifier; selecting using the attention mechanism a plurality of k-grams from the extracted k-grams: and providing a classification result and selected k-grams as the output to the expert. It is beneficial to use k-grams, which is a widely applied technique in handling sequence-type data, because it can efficiently reduce the computation while still capturing most of the information contained in the data.

In a further implementation form of the first aspect, the method further comprises training the classifier using each of extracted k-grams. It is beneficial to train the classifier using all extracted k-grams so that the training material is more complete.

In a further implementation form of the first aspect, the method further comprises assigning an attention weight to each k-gram: aggregating the attention weights using a pre-calculated set of attention weights: and providing in the output to the expert a classification result and k-grams with an attention weight higher than a predetermined threshold. Using attention weight and comparing it against a threshold provides an efficient way to select the k-grams that are actually significant for the classification result.

In a further implementation form of the first aspect, the step of classifying the behavior further comprises inputting the behaviour sequence into a recurrent neural network of the neural network based classifier: combining an output of the recurrent neural network with the output of the attention mechanism: providing the combined output into a multi-layer perceptron: and providing a classification result and a behaviour sequence corresponding to the recurrent neural network output selected by the attention mechanism. Using a multi-layer perceptron for providing a final classification result improves the correctness of the classification as the final result is based on a combined model from the neural network based classifier and the attention mechanism.

In a further implementation form of the first aspect, the step of deriving the behaviour sequence comprises receiving the behaviour sequence from an external system. This is beneficial as the suspected malware does not need to be executed in the classification environment. This increases the security of the overall system as the malware cannot change the classification result.

In a further implementation form of the first aspect, the external system is a sand-box arrangement. This is beneficial because the malware cannot propagate to a systems that are used in production or everyday life. Furthermore, this is beneficial as the sand-box arrangement can be easily cleaned. Thus, if a malware infects the sand-box environment used for generating the behaviour sequence it is easy to clean so that also the subsequent analyses are reliable as the environment is not infected by another malware that could cause false results.

In a further implementation form of the first aspect, the behaviour sequence comprises a list of API-calls performed by the computer program. This is beneficial as the API-calls depict very well the computer program activity and increased API-calls can be associated with normal and malicious activity. Malicious activity may be, for example, excessive use of network connection or processor.

In a further implementation form of the first aspect, the classification result comprises classification into malware and non-malware, and in case of malware the classification further comprises classifying malware into a particular malware family. It is beneficial to determine also the class of malware as different classes have different kind of behaviour. Knowing the class of malware increases the reliability of the classification result and provides system operators tools for preventing malware.

According to a second aspect, a computer program for detecting malware is provided. The computer program comprises computer program code, wherein the computer program code is configured to cause performing a method as described above, when the computer program code is executed in a computing device. It is beneficial to have the possibility to implement the method as a computer program so that it can be executed in a general purpose computer.

According to a third aspect, an apparatus for determining malware is disclosed. The apparatus for determining malware comprises at least one processing circuitry configured to cause performing a method as described above. It is beneficial to use an apparatus for performing the method as the apparatus can be specially prepared for the execution of the method.

An advantage of embodiments of the above disclosed method, computer program and apparatus, is that the selection, which may be operated for example by the attention module, allows the identification of key elements of the sequence responsible for the final decision of the classifier. Classifying execution traces, such as API-calls, that are relevant for malware prediction, so that the extracted sub-sequence can help an expert to understand the classification result, who, if qualified, can provide feedbacks to the classification system to improve its performance. Compared to the conventional approaches, this selection has the desirable advantage of being learnt in a supervised manner using backpropagation and gradient descent on the cross-entropy loss.

The foregoing and other objects are achieved by the subject matter of the independent claims. Further implementation forms are apparent from the dependent claims, the description and the figures.

The principles discussed in the present description can be implemented in hardware and/or software.

BRIEF DESCRIPTION OF THE DRAWINGS

Further example embodiments will be described with respect to the following figures, wherein.

In the various figures, identical reference signs will be used for identical or at least functionally equivalent features.

DETAILED DESCRIPTION OF THE EMBODIMENTS

In the following description, reference is made to the accompanying drawings, which form part of the disclosure, and in which are shown, by way of illustration, specific aspects in which the present apparatuses and methods may be placed. It is understood that other aspects may be utilized and structural or logical changes may be made without departing from the scope of the claims. Thus, the following detailed description, therefore, is not to be taken in a limiting sense.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
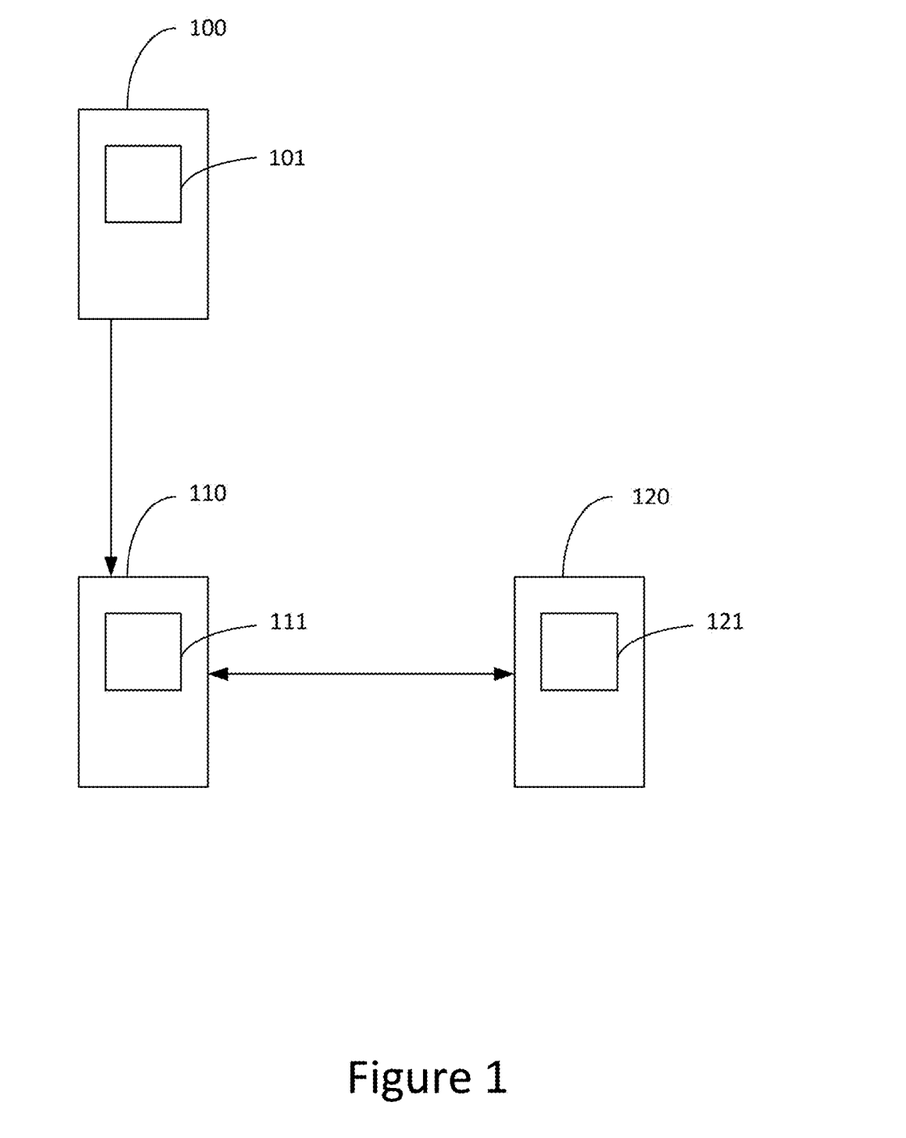
FIG. 1 shows an example of a block diagram of an arrangement for detecting malware, in accordance with embodiments of the disclosure.

FIG. 1 discloses an arrangement comprising three computing entities 100, 110, 120. The three computing entities each comprise a circuitry 101, 111, 121 that is suitable for executing computer programs. The circuitry typically comprises one or more processors that are configured to execute computer programs. The circuitry further comprises at least one memory for storing computer programs and the related data. The circuitry typically further comprises a network connection using which the computing device can be connected to the internet. A computing entity is typically an ordinary general purpose computer with an operating system and specific software that is configured to perform the functionality described below with the examples. Instead of a general purpose computer it is possible to use equipment that can be considered to be equivalent, such as a mobile phone. Furthermore, the similar principles may be used in analyzing software for special purpose devices, however, malware is more common in popular general purpose devices.

In the arrangement of FIG. 1, the computing device 100 is a sandbox environment. A sandbox is a computing device, such as ordinary computer, that may be physical or virtual. A sandbox differs from an ordinary computer in that sense that it is made secure by limiting the activities what the software can do. The purpose of this is to prevent the malware distributing outside the sandbox environment. The sandbox is used for deriving behaviour sequences of computer programs. When a computer program needs to be verified it will be executed in the sandbox environment. The sandbox environment 100 comprises another computer program that is configured to track the behaviour of the verified program. For example, all API-calls of the verified program can be monitored and stored so that they can be analyzed further in another computing device. Instead of API-calls it is possible to monitor, for example, network accessing or use of other hardware resources, for example, camera or microphone of a mobile phone. The stored behaviour sequence represents the activity of the verified program. Thus, if the program is malware and intends to use the computing device in undesired manner the behaviour sequence comprises a representative sample of undesired activity. An API-call is understood to be a call that is done through an Application Programming Interface, which essentially a mechanism for one or more computer programs to send and receive messages from other computer programs, operating system, program code libraries and similar. For example, a computer program may request access to network devices, hard drives and similar through an API. As a response the requested data is provided. As API-calls are used in accessing device resources it is possible to determine what is normal and what is abnormal. For example, if a program is accessing extensively hard disk and network interface, it is possible that the program is performing something what is not normal and it is possible that the program placing these requests may do it with malicious intent.

In FIG. 1, the computing device 110 is an analyzing computer facility that derives the behaviour sequence from computing device 100 that is acting as a sandbox. Computing device 110 may be connected to several sandbox computers, or virtual sandbox entities, for receiving behaviour sequences to be analyzed. The computing device 110 may receive a behaviour sequences also from other sources, such as databases to which behaviour sequences have been stored. The computing device 110 runs a neural network based classifier that classifies the received behaviour sequences. The classifier is a machine learning based classifier that can use verified classification results as a further training material. An example of such machine learning based classifier is the neural network based classifier explained in detail below: The computing device 110 may be of similar type with the sandbox 100. This, however is not necessary. For example, if a neural network based classifier is used, it is possible to use computing resources that are particularly designed for executing neural network applications. As computing device 110 is used only for analyzing it does not need to be able to execute the malware.

Computing device 120 is an external system that is used by an expert. The computing device 120 receives requests from the computing device 110 and shows them to the user. The user, who is an expert in the malware and computer behaviour, can make a decision for the request. The request comprises subsequences of behaviour sequence and an initial classification result. The expert may decide, based on the received subsequences, if the analyzed computer program is malware or not. The made decision can be fed back to the neural network based classifier or any other machine learning based classifier as feedback. The computing device 120 may be any kind of computing device that is capable of communicating with other devices, particularly with the computing device 110, and is capable of showing the behaviour subsequences and classification results to the expert. Furthermore, the expert must be able to provide feedback with the computing device 120.

Figure 2:
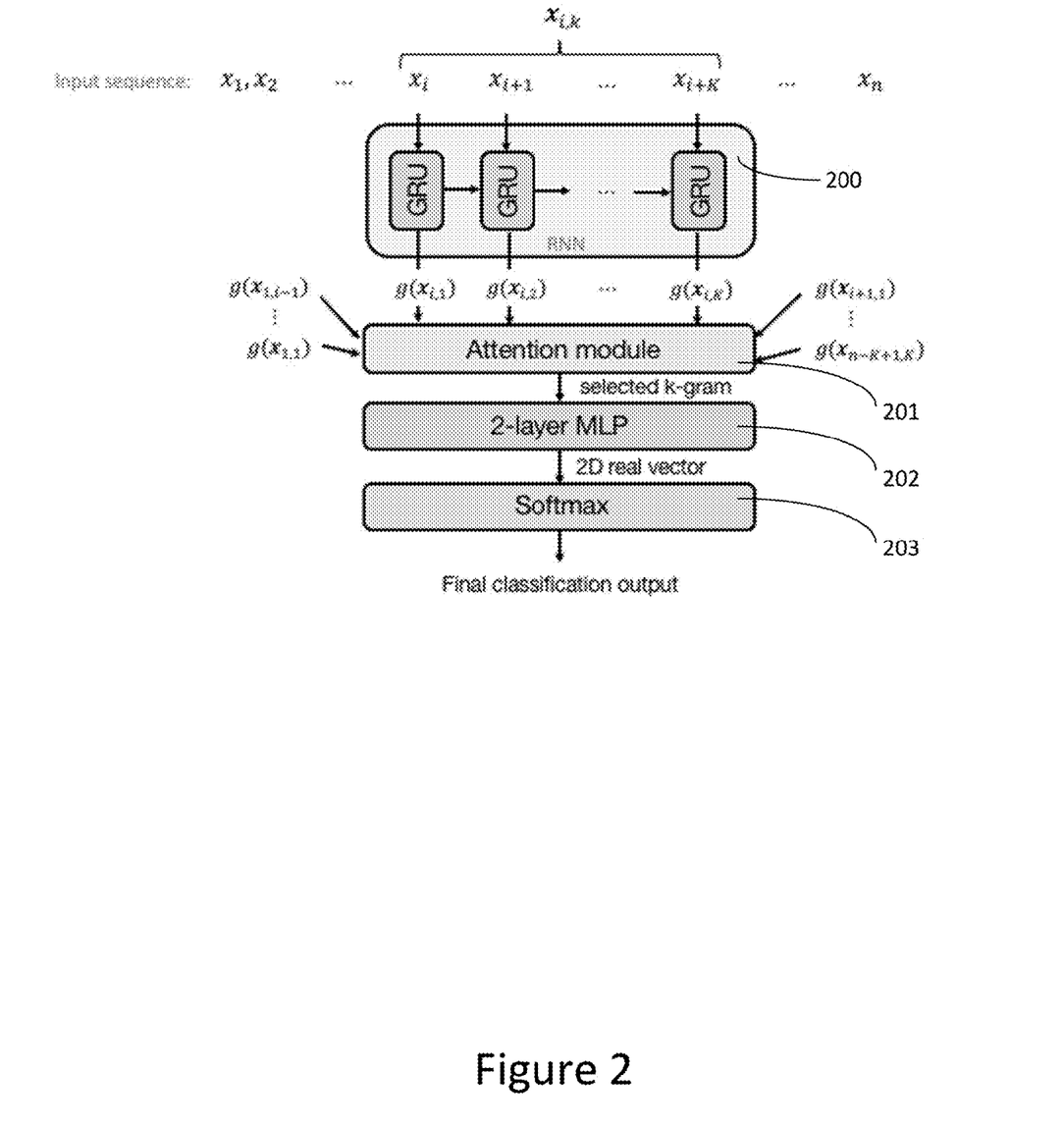
FIG. 2 shows an example flow chart of a neural network based classifier, in accordance with embodiments of the disclosure.

FIG. 2 discloses a method according to an example of malware classification. The input which is received at the beginning of the method comprises a behaviour sequence of a computer program. The behaviour sequence is derived as an execution trace of the computer program as described above. The execution trace comprises selected activity and it is recorded in a sandbox environment.

Before the example of FIG. 2 can be used, the recurrent neural network used for classification in the example needs to be trained. This can be done by providing the recurrent neural network a large database of examples of malware as a training material. The training material may comprise several different types of malware and also non-malware so that the recurrent neural network, which is an example of a machine learning classifier, can be trained as a model for the classification of execution traces and selection of important subsequences for malware detection. The training may be, and is typically, supplemented during the ordinary period of use. This is also the case with the present arrangements, wherein particularly the expert feedback is used as a training material.

When the recurrent neural network has been trained, the ordinary use of the method may be initiated. In the method first an input, which comprises a behaviour sequence of the analyzed program, is fed into the recurrent neural network, step 200.

In the example of FIG. 2, a neural network classifier based on the concept of attention weights for automatic k-gram selection is shown. In essence, important k-grams are first selected through a combination of recurrent neural network, step 200, and attention modules, step 201, and then given as input to a simple multilayer perceptron, a feedforward neural network module, to create the final result step 202. The use of the recurrent neural network helps in learning a representation for each k-grams, and the use of attention weights allows us to know which k-grams are important for the underlying malware classification task. A k-gram is a contiguous sequence of k items from the behaviour sequence that has been derived from a sandbox environment, or similar. The items represent API-calls or similar, from where the behaviour of the computer program can be determined.

The recurrent neural network 200 receives a behaviour sequence of a program that is being analyzed. When deciding about the classification, which comprises at least deciding if the analyzed computer program is malware and typically also to which malware class it belongs to, the recurrent neural network typically makes the determination based on subsequences of the received behaviour sequence. This is because it is common that the whole behaviour sequence is not significant and malicious activity is determined based on the relevant sections. In the following it is explained how the determination of the relevant sections can be done.

In the example of FIG. 2 for the recurrent neural network, the following applies: For any given input sequence $x=(x_1, x_2, \ldots x_n)$, k-grams $x_{i,k}=(x_i, \ldots x_{i+k-1})$ of the sequence for $i \in \{1, 2, \ldots, n-k+1\}$ are extracted. These k-grams will be mapped to vector representations with a recurrent neural network, more specifically in this example GRU (Gated Recurrent Unit), which captures the characteristics of the k-grams most relevant for malware classification.

The recurrent neural network layer, also known as the embedding layer, receives as input a behaviour sequence comprising API function names, denoted by $a_1; a_2; \ldots; a_n$, and outputs a numerical vector representation of each distinct k-gram occurring in the behaviour sequence, denoted by $\Phi(x_1); \Phi(x_2); \ldots; \Phi(x_m)$. This representation can be computed by using a standard recurrent neural network architecture with gated recurrent unit cells. This step transforms the behaviour sequence into d-dimensional vector representations of distinct k-grams contained in the behaviour sequence, capturing the characteristics of k-grams most relevant for malware classification.

In FIG. 2, an attention module 201 is connected to the recurrent neural network 200 for receiving input. Attention modules are applied in neural network models to learn how to give weights to different tensors so that the final performance can be improved. Here, the algorithm uses an attention module to automatically learn how to give the best weight for each k-gram, so that more important k-grams can be emphasized in the weighted average output, for the multi-layer perceptron part to give better final decisions. A detailed example of determining weights is given with referral to FIG. 3.

The focus of the attention module is not fixed, and thus may change depending on the specific process being considered. For example, a malware may be identified because of its use of a single security related API, while other malware may require a more complex analysis and the use of more of its APIs and k-grams.

Finally, the neural network performs model selection, as the attention module will select k-grams of different sizes, and thus decide if larger or shorter k-grams should be used for classification, depending of the size of the dataset and the size of useful patterns in the input sequences. In the example of FIG. 2 this is done by the multi-layer perceptron 202 and the following softmax operator. These are applied as follows: the classifier's final output is computed using a 2-layer Multilayer Perceptron (MLP) 202 with a 2-dimensional output and a softmax operator 203 to ensure that output values are between 0 and 1.

The arrangement disclosed in FIG. 2 is understood to be an example only. Also other neural network architectures, attention module and feed-forward neural network module may be used, provided that they can be used for similar functionality, wherein relevant behaviour subsequences can be detected and the decision based on these relevant behaviour subsequences may be provided to an expert. An optional possibility to use the opinion of the expert may be provided so that the confirmed or rejected decision, together with the behaviour sequence or at least with the parts determined to be relevant, may be used as a training material for the machine learning based classifier.

Figure 3:
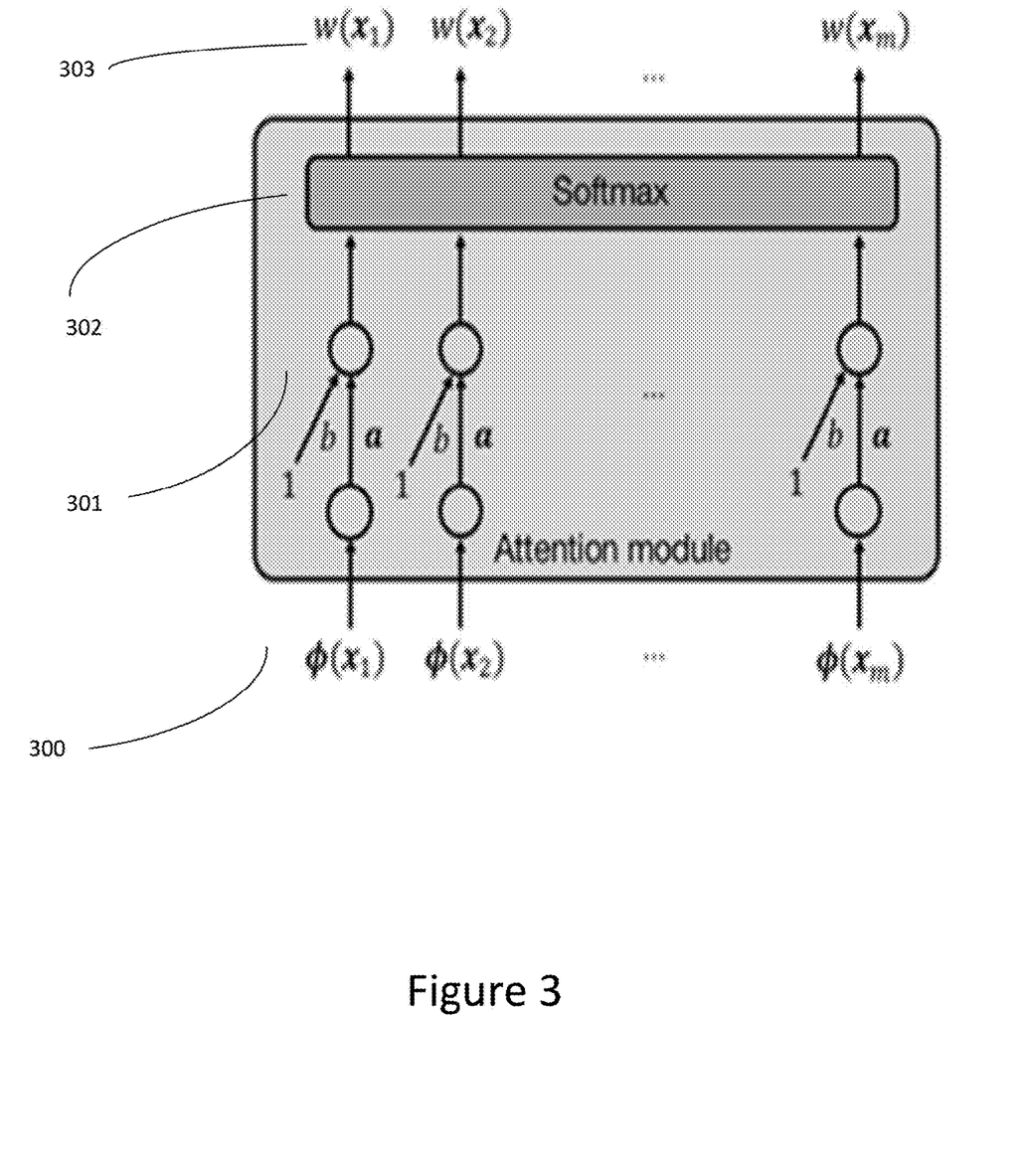
FIG. 3 shows a detailed example of an attention module, in accordance with embodiments of the disclosure.

FIG. 3 discloses a more detailed example of an attention module. In the example input 300 is fed into the attention mechanism 301. The outcome from the attention mechanism is applied with a softmax operator 302 for deriving the output 303.

The classifier, such as the neural network based classifier of FIG. 2, uses an attention module for soft-selection of k-gram representations $\phi(x_i)$ using a softmax operator on linearly transformed k-graph representations. The output of the attention module is given by $$h = \sum_{i=1}^{m} \omega(x_i)\phi(x_i)$$

where $\omega(x_i)$ denote the attention weights.

The attention weights are defined as follows. For each $x \in \mathbb{R}^d$, we define a linear score function $s_\theta(x)=a^T\phi(x)+b$ where $\theta=(a,b) \in \mathbb{R}^d \times \mathbb{R}$ are learnable parameters. The attention weights are then defined by softmax transformation of attention scores, i.e.

$$\omega(x_i) = \frac{e^{s_\theta(\phi(x_i))}}{\sum_{j=1}^{m} e^{s_\theta(\phi(x_j))}}, \text{ for } i = 1, 2, \ldots, m.$$

As the weights have been derived, they can be compared with a predetermined threshold. The weights exceeding the threshold value can be provided to the expert as these are considered to be significant.

As explained above, the arrangements using precoding shuffling as described above may be implemented in hardware, such as a mobile telephone, tablet computer, computer, telecommunication network base station or any other network connected device, or as a method. The method may be implemented as a computer program. The computer program is then executed in a computing device.

The apparatus, such as apparatus for transmitting signals in a communication network, is configured to perform one of the methods described above. The apparatus comprises necessary hardware components. These may include at least one processor, at least one memory, at least one network connection, a bus and similar. Instead of dedicated hardware components it is possible to share, for example, memories or processors with other components or access at a cloud service, centralized computing unit or other resource that can be used over a network connection.

The apparatus for transmitting signals in a communication network and the corresponding method have been described in conjunction with various embodiments herein. However, other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

What is claimed is:

1. A method for detecting malware, the method comprising:
   deriving a behavior sequence of a computer program, wherein the behavior sequence is based on activity of the computer program;
   extracting k-grams from the behavior sequence;
   inputting an extracted k-gram to a classifier;
   selecting a plurality of k-grams from the extracted k-grams;
   classifying the behavior sequence of the computer program to obtain a classification result;
   based on the classification result, determining a need for providing the behavior sequence to an expert;
   in response to a positive determination for providing the behavior sequence to the expert, outputting the classification result and the plurality of k-grams to the expert; and
   determining, based on the classification result, if the computer program is malware.

2. The method according to claim 1, wherein classifying the behavior sequence is performed by a classifier, and wherein the method further comprises:
   receiving an opinion as a response to the outputting to the expert; and
   providing the received opinion as a feedback to the classifier.

3. The method according to claim 1, wherein the classifying the behavior sequence is performed using a neural network based classifier, and wherein the neural network based classifier comprises an attention mechanism for selecting the plurality of k-grams from the extracted k-grams.

4. The method according to claim 1, wherein the method further comprises training the classifier using each of the extracted k-grams.

5. The method according to claim 4, wherein the method further comprises:
   assigning an attention weight to each k-gram of the extracted k-grams;
   aggregating the attention weights using a pre-calculated set of attention weights; and
   providing, in the output to the expert, a classification result and k-grams with an attention weight higher than a predetermined threshold.

6. The method according to claim 5, wherein the classifying further comprises:
   inputting the behavior sequence into a recurrent neural network of the neural network based classifier;
   combining an output of the recurrent neural network with the output of the attention mechanism;
   providing the combined output into a multi-layer perceptron; and
   providing a classification result and a behavior sequence corresponding to the recurrent neural network output selected by the attention mechanism.

7. The method according to claim 1, wherein deriving the behavior sequence comprises receiving the behavior sequence from an external system.

8. The method according to claim 7, wherein the external system is a sand-box arrangement.

9. The method according to claim 1, wherein the behavior sequence comprises a list of API-calls performed by the computer program.

10. The method according to claim 1, wherein the classification result comprises classification into malware and non-malware, and, in case of malware, the classification further comprises classifying malware into a particular malware family.

11. An apparatus for determining malware comprising at least one processing circuitry configured to:
   derive a behavior sequence of a computer program, wherein the behavior sequence is based on activity of the computer program;
   extract k-grams from the behavior sequence;
   input an extracted k-gram to a classifier;
   select a plurality of k-grams from the extracted k-grams;
   classify the behavior sequence of the computer program to obtain a classification result;
   based on the classification result, determine a need for providing the behavior sequence to an expert;
   in response to a positive determination for providing the behavior sequence to the expert, output the classification result and the plurality of k-grams to the expert; and
   determine, based on the classification result, if the computer program is malware.

12. The apparatus according to claim 11, wherein at least one processing circuitry comprises a classifier, and wherein the at least one processing circuitry is further configured to: receive an opinion as a response to the outputting to the expert; and provide the received opinion as a feedback to the classifier.

13. The apparatus according to claim 11, wherein the classifying the behavior sequence is performed using a neural network based classifier, and wherein the neural network based classifier comprises an attention mechanism.

14. A non-transitory computer readable storage medium storing computer executable instructions, wherein the computer executable instructions are executed by a computing device to:
   derive a behavior sequence of a computer program, wherein the behavior sequence is based on activity of the computer program;
   extract k-grams from the behavior sequence;
   input an extracted k-gram to a classifier;
   select a plurality of k-grams from the extracted k-grams;
   classify the behavior sequence of the computer program to obtain the classification result;
   based on the classification result, determine a need for providing the behavior sequence to an expert;
   in response to a positive determination for providing the behavior sequence to the expert, output the classification result and the subsequences of the plurality of k-grams to the expert; and
   determine, based on the classification result, if the computer program is malware.

15. The non-transitory computer readable storage medium according to claim 14, wherein the computing device comprises a classifier, and wherein the computer executable instructions, when executed, by the computing device, further configure the computing device to:
   receive an opinion as a response to the outputting to the expert; and provide the received opinion as a feedback to the classifier.

16. The non-transitory computer readable storage medium according to claim 14, wherein classifying the behavior sequence is performed using a neural network based classifier, and wherein the neural network based classifier comprises an attention mechanism.

17. The non-transitory computer readable storage medium according to claim 14, wherein the computer executable instructions, when executed, by the computing device, further configure the computing device to train the classifier using each of the extracted k-grams.

* * * * *

UNITED STATES PATENT AND TRADEMARK OFFICE
CERTIFICATE OF CORRECTION

PATENT NO. : 12,099,599 B2
APPLICATION NO. : 17/538703
DATED : September 24, 2024
INVENTOR(S) : Draief et al.

It is certified that error appears in the above-identified patent and that said Letters Patent is hereby corrected as shown below:

In the Claims

Claim 3: Column 9, Line 29: "The method according to claim 1, wherein the classi-" should read as -- The method according to claim 1, wherein classi- --.

Claim 8: Column 9, Line 61: "The method according to claim 7, wherein the external" should read as -- The method according to claim 7, wherein external --.

Claim 13: Column 10, Line 28: "The apparatus according to claim 11, wherein the" should read as -- The apparatus according to claim 11, wherein --.

Claim 14: Column 10, Line 43: "to obtain the classification result;" should read as -- to obtain the classification result --.

Signed and Sealed this
First Day of July, 2025

Coke Morgan Stewart
*Acting Director of the United States Patent and Trademark Office*